United States Patent
Buendgen et al.

(10) Patent No.: US 11,500,988 B2
(45) Date of Patent: Nov. 15, 2022

(54) BINDING SECURE KEYS OF SECURE GUESTS TO A HARDWARE SECURITY MODULE

(71) Applicant: International Business Machines Corporation, Armonk, NY (US)

(72) Inventors: Reinhard T. Buendgen, Tuebingen (DE); Tamas Visegrady, Zurich (CH); Ingo Franzki, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 16/296,411

(22) Filed: Mar. 8, 2019

(65) Prior Publication Data

US 2020/0285746 A1    Sep. 10, 2020

(51) Int. Cl.
| | |
|---|---|
| *G06F 21/57* | (2013.01) |
| *G06F 9/455* | (2018.01) |
| *H04L 9/08* | (2006.01) |

(52) U.S. Cl.
CPC .......... *G06F 21/57* (2013.01); *G06F 9/45558* (2013.01); *H04L 9/0877* (2013.01); *G06F 2009/45587* (2013.01); *G06F 2221/034* (2013.01)

(58) Field of Classification Search
CPC ................. G06F 21/57; G06F 9/45558; G06F 2009/45587; G06F 2221/034; H04L 9/0877
See application file for complete search history.

(56) References Cited

U.S. PATENT DOCUMENTS

| | | | |
|---|---|---|---|
| 6,363,480 B1 | 3/2002 | Perlman | |
| 8,891,868 B1 | 11/2014 | Volodymyr | |
| 10,461,943 B1 * | 10/2019 | Norum | ................. H04L 63/0823 |
| 10,601,590 B1 * | 3/2020 | Chhabra | .................. G06F 21/44 |
| 2003/0217258 A1 | 11/2003 | Bade | |
| 2009/0089875 A1 * | 4/2009 | Challener | ................ G06F 21/57 726/16 |
| 2009/0169017 A1 * | 7/2009 | Smith | ...................... G06F 21/57 380/278 |
| 2009/0172781 A1 * | 7/2009 | Masuoka | ............... H04L 63/105 726/3 |

(Continued)

FOREIGN PATENT DOCUMENTS

| | | |
|---|---|---|
| EP | 2280502 | 2/2011 |
| TW | 201635185 | 10/2016 |
| TW | M540310 | 4/2017 |

OTHER PUBLICATIONS

International Search Report, PCT/EP2020/055160, dated Apr. 7, 2020, 4 pages.

(Continued)

*Primary Examiner* — Trang T Doan
(74) *Attorney, Agent, or Firm* — Heslin Rothenberg Farley & Mesiti P.C.

(57) ABSTRACT

A method, computer program product, and a system where a secure interface control configures a hardware security module for exclusive use by a secure guest. The secure interface control ("SC") obtains a configuration request (via a hypervisor) to configure the hardware security module (HSM), from a given guest of guests managed by the hypervisor. The SC determines if the HSM is already configured to a specific guest of the one or more guests, but based on determining that the HSM is not configured to the and is a secure guest the SC forecloses establishing a configuration of the HSM by limiting accesses by guests to the HSM exclusively to the given guest. The SC logs the given guest into the HSM by utilizing a secret of the given guest. The SC obtains, from the HSM, a session code and retains the session code.

20 Claims, 10 Drawing Sheets

(56) References Cited

U.S. PATENT DOCUMENTS

| | | | | |
|---|---|---|---|---|
| 2015/0254451 | A1* | 9/2015 | Doane | H04L 63/20 |
| | | | | 726/1 |
| 2016/0092243 | A1* | 3/2016 | Boenisch | G06F 21/575 |
| | | | | 713/2 |
| 2016/0149877 | A1* | 5/2016 | Kancharla | G06F 9/45558 |
| | | | | 713/171 |
| 2016/0241393 | A1* | 8/2016 | Boenisch | H04L 9/0897 |
| 2016/0261592 | A1 | 9/2016 | Hubert et al. | |
| 2018/0062854 | A1* | 3/2018 | Kancharla | H04L 63/101 |
| 2018/0293406 | A1 | 10/2018 | Boehl et al. | |
| 2019/0207764 | A1* | 7/2019 | Maximov | G06F 9/45558 |
| 2021/0167962 | A1* | 6/2021 | Wang | G06Q 20/3821 |

OTHER PUBLICATIONS

Taiwan Office Action and Search Report, Taiwan Application No. 109104545, dated May 3, 2021, 9 pages.

Mell et al., "The NIST Definition of Cloud Computing", National Institute of Standards and Technology, U.S. Department of Commerce, NIST Special Publication 800-145, Sep. 2011, 7 pages.

Smith et al., "Validating a High-Performance, Programmable Secure Coprocessor", Secure Systems and Smart cards, IBM T.J. Watson Research Center, New York, Oct. 1999, 11 pages.

Australian Office Action and Examination Report, Australian Application No. 2020234675, dated Jan. 19, 2022.

\* cited by examiner

BINDING SECURE KEYS OF SECURE GUESTS TO A HARDWARE SECURITY MODULE

BACKGROUND

In today's computer systems and information transport networks, cryptographic elements are important technological components. Information may be stored or transmitted in a cryptographically secured form in order to avoid unauthorized access to the information stored or transmitted. In some cases, pure software-based techniques may be used and, in other cases, hardware support and security specific elements may be used to perform such data protection. In some cases, these specific elements are named hardware security modules (HSMs) which may be used as part of a computer or an information transmission system. Such a hardware security module may include specific circuitries in order to provide functions for data encryption and data decryption. The function may also include generating and storing cryptographic keys for a use of guest systems.

HSMs contain master keys that may not be accessible to unauthorized parties. These master keys are used to encrypt (i.e., wrap) keys available to the users of the HSM. Such keys wrapped by a HSM master key are called secure keys. HSMs are tamper-proof and protect the secret against unauthorized access (e.g., unscheduled physical plugging, physical infiltration, etc.). A HSM can be assigned to various virtual resources, such as virtual machines (VMs) and in a virtual environment the HSM may not be aware of its reassignment from one VM to another VM.

The flexibility of VM assignments can pose a security issues because in highly sensitive hosted information technology (IT) environments, a stricter security protocol would support protecting trusted users that utilize guests with secure keys (being wrapped by the master key of the HSM) from use of the secure keys by untrusted users, even if the guests themselves are hacked or otherwise compromised and the secure key and other data is stolen.

SUMMARY

Shortcomings of the prior art are overcome and additional advantages are provided through the provision of a method for binding secure keys of secure guests to a hardware security module. The method includes, for instance: configuring, by a secure interface control, communicatively coupled to a hypervisor and a hardware security module, the hardware security module for exclusive use by a secure guest managed by the hypervisor, the configuring comprising: obtaining, by the secure interface control, a configuration request to configure the hardware security module, from a given guest of one or more guests managed by the hypervisor, via the hypervisor; determining, by the secure interface control, if the hardware security module is already configured to a specific guest of the one or more guests, wherein the specific guest and the given guest comprise different guests of the one or more guests; based on determining that the hardware security module is not configured to the specific guest, determining, by the secure interface control, that the given guest comprises the secure guest by evaluating metadata of the given guest; based on determining that the given guest comprises a secure guest, foreclosing, by the secure interface control, establishing a configuration of the hardware security module by limiting accesses by guests to the hardware security module exclusively to the given guest of the one or more guests; logging the given guest into the hardware security module, by the secure interface control, wherein the logging into the hardware security module comprises utilizing a secret of the given guest, wherein the metadata comprises the secret; based on the logging into the hardware security module, obtaining, by the secure interface control, from the hardware security module, a session code; and retaining, by the secure interface control, the session code.

Shortcomings of the prior art are overcome and additional advantages are provided through the provision of a computer program product for binding secure keys of secure guests to a hardware security module. The computer program product comprises a storage medium readable by a processing circuit and storing instructions for execution by the processing circuit for performing a method. The method includes, for instance: configuring, by the one or more processors, communicatively coupled to a hypervisor and a hardware security module, the hardware security module for exclusive use by a secure guest managed by the hypervisor, the configuring comprising: obtaining, by the one or more processors, a configuration request to configure the hardware security module, from a given guest of one or more guests managed by the hypervisor, via the hypervisor; determining, by the one or more processors, if the hardware security module is already configured to a specific guest of the one or more guests, wherein the specific guest and the given guest comprise different guests of the one or more guests; based on determining that the hardware security module is not configured to the specific guest, determining, by the secure interface control, that the given guest comprises the secure guest by evaluating metadata of the given guest; based on determining that the given guest comprises a secure guest, foreclosing, by the one or more processors, establishing a configuration of the hardware security module by limiting accesses by guests to the hardware security module exclusively to the given guest of the one or more guests; logging the given guest into the hardware security module, by the one or more processors, wherein the logging into the hardware security module comprises utilizing a secret of the given guest, wherein the metadata comprises the secret; based on the logging into the hardware security module, obtaining, by the one or more processors, from the hardware security module, a session code; and retaining, by the one or more processors, the session code.

Shortcomings of the prior art are overcome and additional advantages are provided through the provision of a system for binding secure keys of secure guests to a hardware security module. The system comprises a memory, one or more processors in communication with the memory, and program instructions executable by the one or more processors via the memory to perform a method. The method includes, for instance: configuring, by the one or more processors, communicatively coupled to a hypervisor and a hardware security module, the hardware security module for exclusive use by a secure guest managed by the hypervisor, the configuring comprising: obtaining, by the one or more processors, a configuration request to configure the hardware security module, from a given guest of one or more guests managed by the hypervisor, via the hypervisor; determining, by the one or more processors, if the hardware security module is already configured to a specific guest of the one or more guests, wherein the specific guest and the given guest comprise different guests of the one or more guests; based on determining that the hardware security module is not configured to the specific guest, determining, by the secure interface control, that the given guest comprises the secure guest by evaluating metadata of the given guest; based on determining that the given guest comprises a secure guest, foreclosing, by the one or more processors, establishing a configuration of the hardware security module by limiting accesses by guests to the hardware security module exclusively to the given guest of the one or more guests; logging the given guest into the hardware security module, by the one or more processors, wherein the logging into the hardware security module comprises utilizing a secret of the given guest, wherein the metadata comprises the secret; based on the logging into the hardware security module, obtaining, by the one or more processors, from the hardware security module, a session code; and retaining, by the one or more processors, the session code.

Methods and systems relating to one or more aspects are also described and claimed herein. Further, services relating to one or more aspects are also described and may be claimed herein. For example, in some embodiments of the present invention, the retaining comprises storing an association of the session code with a NULL session code in a table of associations in the secure interface control.

In some embodiments of the present invention, the metadata of the guest is integrity protected and the secret is encrypted by a key derived using a private key owned by the secure interface control. The private key can comprises a cryptographic measure of a boot image of the given guest.

In some embodiments of the present invention, the processor(s) and/or secure interface control based on the configuring, provides, to the given guest, a new session code to utilize by the given guest in requests to the hardware security module.

In some embodiments of the present invention, the providing (by the processor(s) and/or secure interface control) comprises: the processor(s) and/or secure interface control intercepting a hardware security module login request from the given guest, wherein the hardware security module login request comprises login data from the given guest; the processor(s) and/or secure interface control generating new login data based on the secret of the given guest; the processor(s) and/or secure interface control issuing, to the hardware security module, a new hardware security module login request from the given guest, wherein the new hardware security module login request comprises the new login data; the processor(s) and/or secure interface control obtaining a session code from the hardware security module; based on obtaining the session code from the hardware security module, the processor(s) and/or secure interface control generating, the new session code; the processor(s) and/or secure interface control storing an association between the session code from the hardware security module and the new session code in the table; and the processor(s) and/or secure interface control transmitting the new session code to the given guest, responsive to the login request.

In some embodiments of the present invention, the processor(s) and/or secure interface control intercepts a request from the given guest to the hardware security module, where the request comprises the new session code. The processor(s) and/or secure interface control obtains, from the table, the session code from the hardware security module associated with the new session code. The processor(s) and/or secure interface control updates the request from the given guest to comprise a new request, wherein the new request comprises the session code from the hardware security module instead of the new session code. The processor(s) and/or secure interface control issues the new request to the hardware security module.

In some embodiments of the present invention, the processor(s) and/or secure interface control obtains, from the hardware security module, fulfillment of the request. The processor(s) and/or secure interface control issues the fulfillment of the request to the given guest. In some embodiments of the present invention, the request is selected from the group consisting of: a hardware security module secure key generation request, and a hardware security module logout request.

In some embodiments of the present invention, the processor(s) and/or secure interface control obtains, from the hypervisor, an indication that the given guest has stopped. The processor(s) and/or secure interface control identifies the association between the session code from the hardware security module and the new session code in the table. The processor(s) and/or secure interface control generates a list of one or more sessions utilizing the session code from the hardware security module, based on the table. The processor(s) and/or secure interface control logs out the given guest from the one or more sessions.

In some embodiments of the present invention, the processor(s) and/or secure interface control obtains, from the hypervisor, an indication that the given guest has stopped. The processor(s) and/or secure interface control removes the configuration.

In some embodiments of the present invention, the processor(s) and/or secure interface control obtains, from the hypervisor, an indication that the given guest has stopped. The processor(s) and/or secure interface control identifies references to the given guest retained in the hardware security module. The processor(s) and/or secure interface control removes the references.

In some embodiments of the present invention, the secure interface component is selected from the group consisting of: firmware, hardware, and software.

In some embodiments of the present invention, determining that the given guest comprises the secure guest by evaluating metadata of the given guest comprises the processor(s) and/or secure interface control verifying one of a presence or a type of the metadata.

In some embodiments of the present invention, the processor(s) and/or secure interface control utilizing the secret of the given guest, comprises the processor(s) and/or secure interface control decrypting the secret.

In some embodiments of the present invention, the decrypting comprises utilizing a key computed exclusively by the secure interface control.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
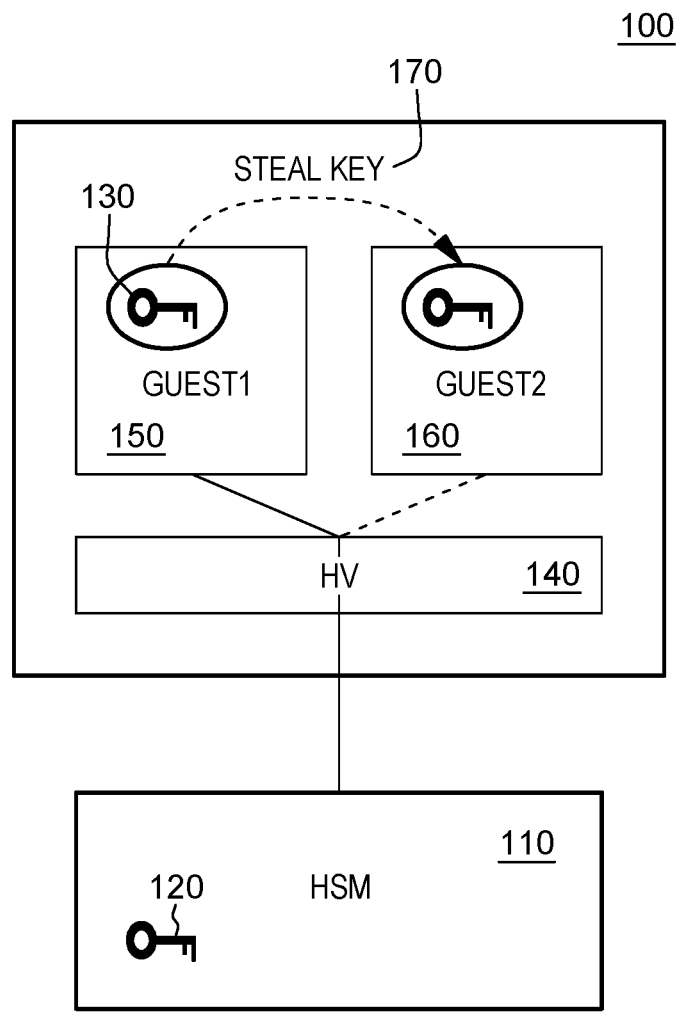
FIG. 1 illustrates security issues experienced with current approaching utilizing a hardware security module.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 9:
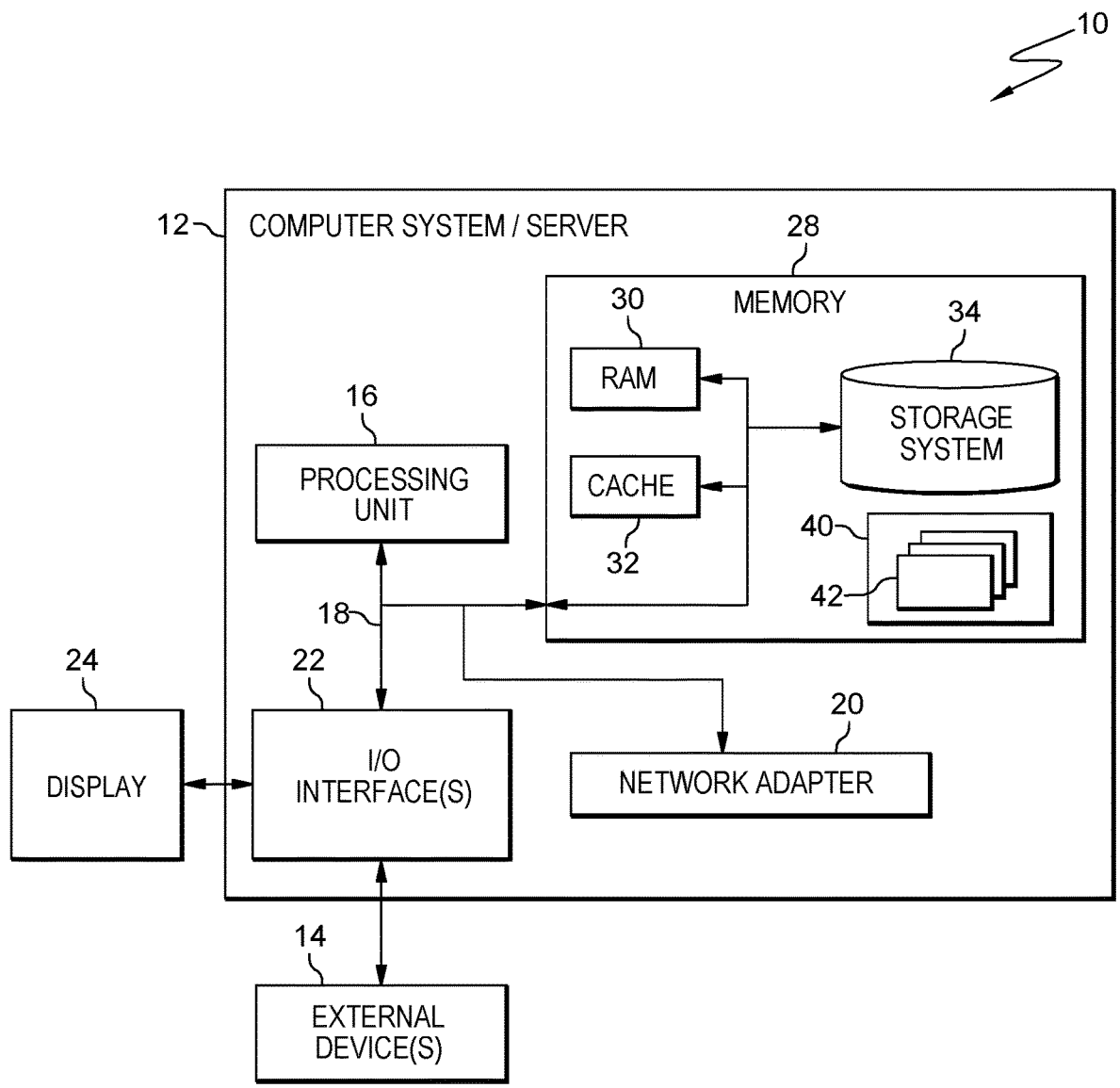
FIG. 9 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 9 as program/utility 40, having a set (at least one) of program modules 42, may be stored in memory 28.

The term 'hardware security module' or HSM can denote a pluggable component or an individually connected component to a computer system. The HSM can perform encryption and decryption operations using a master key or another provided key (e.g., a guest key). The encryption and/or decryption can be performed in hardware and software, or any combination of both, on the hardware security module. Data can be received by the hardware security module in an unencrypted way and can be encrypted on the HSM, or vice versa.

The term 'guest system' can denote, e.g., an operating system being executed in a virtual machine, VM, on a hypervisor. A user can be assigned to the guest system. It can be that a specific cryptographic key can be assigned to the guest system. The mentioned hypervisor can be used in performing such an assignment. The specific cryptographic key can be stored on a HSM.

The term 'content' can denote any character-based string. The string can comprise readable text or any other binary data.

The term 'a data pattern' can basically be another expression for content. The data pattern can denote a string of readable characters or can include binary data. In the context of this document, no additional requirements are placed on the data pattern. It can also be predefined, randomly selected or, otherwise determined.

The term 'master key' can denote an encryption/decryption key being stored on the HSM. In the context of this document, it can be assumed, in one embodiment, that the master key can never be transferred out of the hardware security module it is stored on.

The term 'guest encryption unit' can denote a module adapted to perform an encryption and/or decryption operation within or, as part of the guest system or, as a service used by the guest system.

The term 'hardware security module encryption unit' can denote a module within the HSM being adapted to encrypt any data pattern using the master key or another provided key, e.g., the guest key. Accordingly, a 'hardware security module decryption unit' can be used for decrypting any data pattern, e.g., the guest key, using the master key or, decrypting another data pattern using another provided key, e.g., the guest key.

It can be noted that the hardware security module, i.e., a HSM, can be, e.g., a crypto card. The guest system can, e.g., be a virtual machine, i.e., a VM, running or executing a guest operating system. The configuring the HSM can include storing the master key in a memory of the HSM.

Embodiments of the present invention include a computer-implemented method, a computer program product, and a computer system that include program code executed on at least one processing circuit that efficiently bind a secure key of a HSM to a specific guest belonging to a particular owner such that data protected by the HSM can only be used within the system that has access to the HSM. Specifically, as explained in more detail below, in embodiments of the present invention, program code executing on one or more processors binds a secure key of a secure guest (e.g., a VM) configured to use a HSM, to a HSM session code based on a secret which is cryptographically linked to the image of the secure guest. However, the secret is not part of the guest. Rather, as described herein, it is independently transported to a secure interface control (e.g., firmware, trusted component) though a secure channel (i.e., encrypted) as part of the guest metadata and cryptographically linked to the guest. The metadata is cryptographically linked to a guest (e.g., contains a signature of the guest image) so metadata of one guest cannot be misused as metadata of another guest. Thus, the secure interface control can verify that guest and metadata/secret belong together. In some embodiments of the present invention, the secret is linked to a boot image of the secure guest, which is cryptographically bound to metadata that is securely (integrity and confidentiality protected) transferred (e.g., and independently, through a secure channel) to a trusted component. In some embodiments of the present invention, the portion of the metadata that contains the secret would is encrypted by a key that only a secure interface control can compute.

A secure guest can also be referred to as a guest virtual machine, a virtual machine and/or a virtual server. In embodiments of the present invention, the program code provides the secret (securely) a secure interface control (e.g., firmware, trusted component) as part of the installation metadata provided to start the image of the secure guest. Although linked to the guest, the secret is independently transported to the secure interface control though a secure channel (i.e., encrypted) as part of the guest metadata and cryptographically linked to the guest. Thus, the secure interface control can verify that guest and metadata/secret belong together. Thus, in some embodiments of the present invention, the metadata of a secure guest is integrity protected and includes a secret encrypted by a key derived using a private key owned by the secure interface control (e.g., a cryptographic measure of the boot image of the given guest). The metadata need not be accessible to the secure guest, itself. As we be explained in more detail below, in embodiments of the present invention, program code of the trusted component: 1) reserves a HSM for the secure guest for the lifetime of the guest; 2) opens HSM sessions using the secret; 3) intercepts HSM key generation requests and re-issues the requests replacing the used session code with session codes received in return when opening sessions using the secret; and 4) closes all sessions opened using the secret when the secure guest is terminated.

FIG. 1 is a portion of a shared computing environment 100 that includes a HSM 110 that illustrates an issue with existing approaches to HSM-related key security that are addressed by embodiments of the present invention, thus demonstrating how embodiments of the present invention provide significantly more than existing approaches to key security in HSMs. As illustrated in FIG. 1, the HSM contains a master key 120 that is not accessible to unauthorized parties. The master key 120 is utilized by program code of the HSM to encrypt (i.e., wrap) keys that the program code of the HSM makes available to the users of the HSM. The keys wrapped by a HSM master 120 key are called secure keys. In FIG. 1, a guest 150, guest1, a virtual machine (VM) is in possession of a secure key 130, which the hypervisor 140 provided to the guest 150, from the HSM 110. As understood by one of skill in the art, HSMs are tamper-proof and protect secrets against unauthorized access, (e.g., unscheduled physical plugging, physical infiltration, etc.), however, the guest 150 does not have comparable security and therefore can represent a vulnerability. In a virtual environment, because the hypervisor 140 controls the assignment of a secure key 130, the HSM 110 may not be aware of its reassignment from one guest (i.e., VM) to another guest (i.e., VM). Thus, there exists a security vulnerability if a malicious user hacks a given guest 150, guest1, utilizing a second guest 160, guest2, and the secure key 130 assigned to the guest 150 is retained by the second guest 160. Thus, a second guest 160 can steal (170) the secure key 130 of the guest 150 to which it was assigned by the hypervisor 140. This is particularly an issue in highly sensitive hosted IT environments, where the owner of hosted guests wishes to maintain security that is more aggressive than the administrators of the host environment. In a shared computing environment 100, various guests can be owned by different entities and the HSM 110 can belong to only certain of those entities. Thus, a guest owner, such as the owner of the guest 150 to which the secure key 130 was assigned desires to maintain its secure key 130, which is wrapped by the master key 120 of the HSM 110. This guest owner does not want the secure key 130 to be used by untrusted guests that are owned by different entities who utilize resources in the shared computing environment 100. In FIG. 1, the guest and the second guest 160 have different owners and the owner of the guest 150 wants to make sure that even if the guest 150 is hacked, as illustrated in FIG. 1, and the secure key 130 and other data is stolen (170), it cannot be utilized by any owner other than the owner of the guest 150 to which the secure key 130 was originally assigned.

Embodiments of the present invention are inextricably tied to computing at least because they are directed to addressing an issue that is unique to computing and providing a technical approach that is also within this sphere. Embodiments of the present invention bind a secure key of a HSM to a specific guest (e.g., VM) belonging to a particular owner. The issue illustrated in FIG. 1 which aspects of some embodiments of the present invention serve to address is specific to computing (i.e., an unauthorized guest gaining access to a secure wrapped key of an authorized guest). Given that both the issue and the approach are specific to computing, embodiments of the present invention are inextricably tied to computing.

Embodiments of the present invention provide significant advantages over existing approaches to the key security issues illustrated in FIG. 1. For example, some existing approaches provide support for key security by providing a context to execute a guest without the hypervisor being able to access memory used by the guest and/or installing this secure guest confidentially (i.e., protecting a secret within the installation data for the guest using a public key of which only the trusted component, the hardware (HW) and/or firmware (FW) component, can access the private key). In some embodiments of the present invention, the secure interface control (which can also be understood as a trusted component) is hardware, firmware, or a combination thereof. This approach adds an extra layer of complexity and still does not bind a guest owner to a given secure key. Other approaches create individual sessions to bind a secure key a session code (which depends on session login data), but this approach eliminates the functionality of having a given key for continuous use by a guest, compromising the efficiency of processing involving the guest in situations where the secure key is utilized. Additionally, some approaches attempt to bind a HSM to an operating system (OS) image. These approaches have specific flaws that are not found in embodiments of the present invention: 1) when the boot device changes the bind is broken; and/or 2) the HSM adapter can only be checked after it has been plugged.

Figure 2:
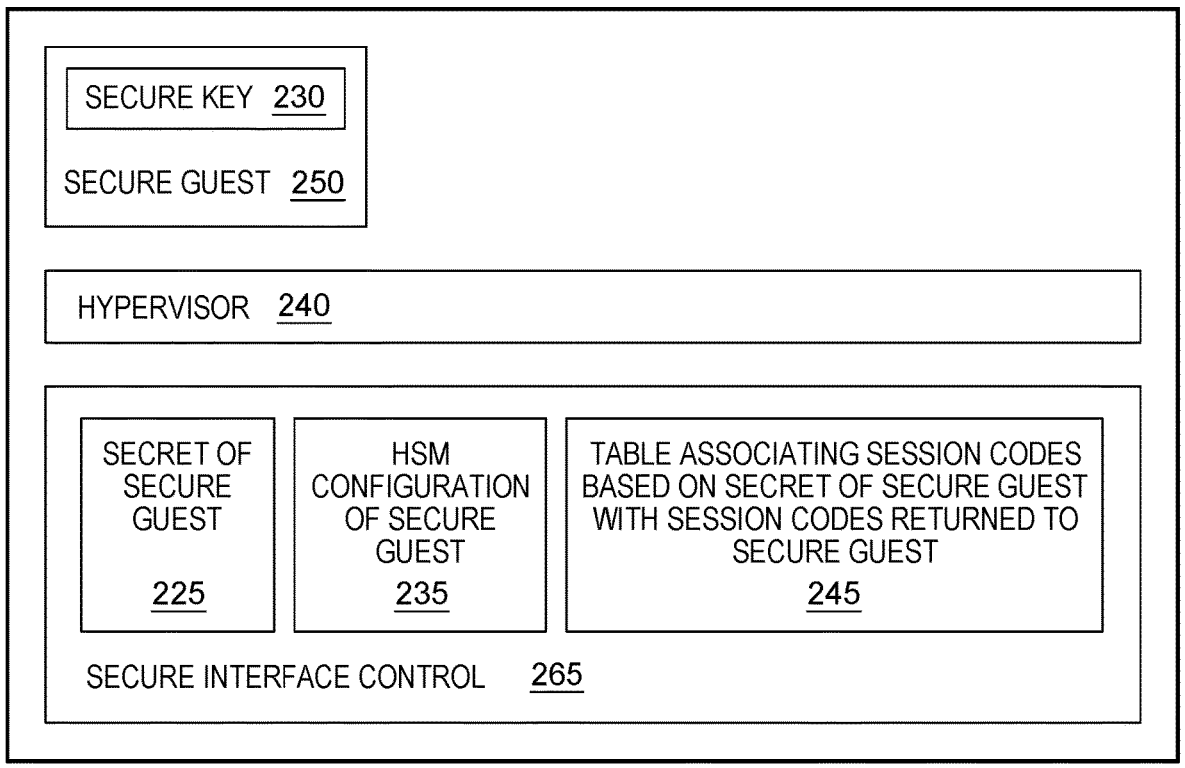
FIG. 2 illustrates various aspects of some embodiments of the present invention.

FIG. 2 illustrates various aspects of a computing environment 200, such as a shared computing environment, in which aspects of some embodiments of the present invention are implemented. Like in FIG. 1, the HSM 210 include a master key 220. Also, a hypervisor 240, interacts with guests (e.g., VMs), including the secure guest 250, which is understood as such because its secure key 230 (wrapped with the master key 220) is bound to the HSM 210. In addition to the hypervisor 240, in embodiments of the present invention, a trusted component, illustrated in this non-limiting example as secure interface control 265, but can also be a secure interface control, in other embodiments of the present invention, supports the configuration of passthrough access to the HSM 210. Specifically, in some embodiments of the present invention, the secure interface control 265 enforces a policy that once a passthrough access is configured for a secure guest 250, during the lifetime of that secure guest 250, the HSM 210 cannot be configured (temporarily) to another guest or to component of the system. In some embodiments of the present invention, the secure interface control 265 opens sessions to the HSM 210 based on a secret 225, which is part of guest metadata cryptographically linked to the guest, which can be contained in the installation data of the secure guest (e.g., the secure execution (SE) header) and binds all secure keys 230 of the secure guest 250 to that secret 225. The secret 225 is cryptographically linked to the image of the secure guest 250 and is securely provided to the secure interface control 265 as part of installation metadata provided to start the image of the secure guest 250. The secret 225 is not part of the secure guests 250 and is transported to the secure interface control 265 (though a secure channel, i.e., encrypted) as part of the guest metadata, and cryptographically linked to the secure guest 250. Thus, the secure interface control 265 can verify that the secure guest 250 and metadata/secret 225 belong together. The metadata of a secure guest 250 is integrity protected and includes the secret 225, which can be encrypted by a key derived using a private key owned by the secure interface control 265 (e.g., a cryptographic measure of the boot image of the given guest).

Figure 3:
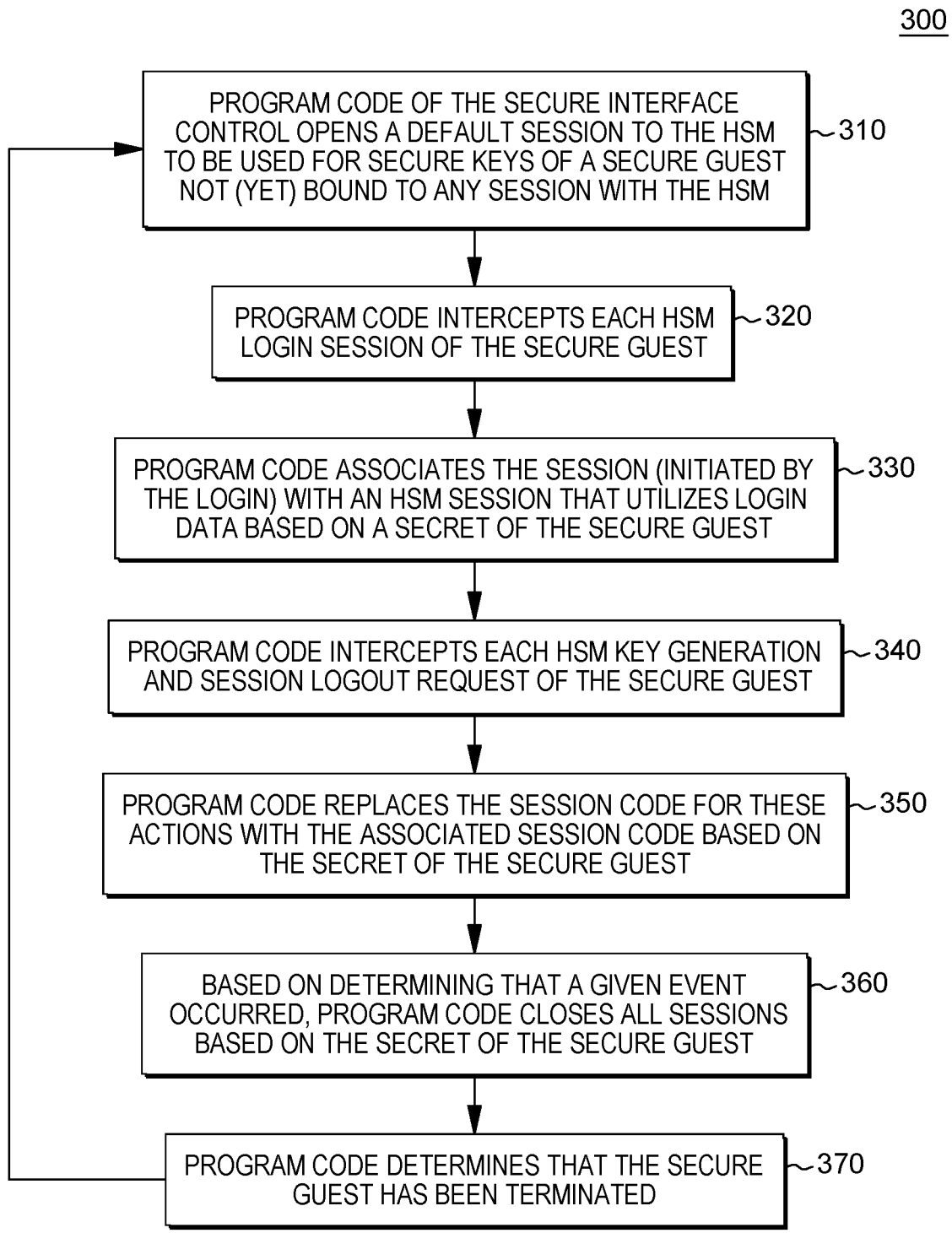
FIG. 3 is a workflow that illustrates certain aspects of some embodiments of the present invention.

FIG. 3 is a workflow 300 that illustrates various aspects of some embodiments of the present invention. For illustrative purposes only, the workflow 300 is illustrated with references to the computing environment 200 of FIG. 2. Specifically, FIG. 3 is a workflow 300 that illustrates aspects of binding a secure guest 250 (a guest with at least one secure key 230 that was wrapped by a HSM master key 220) to the HSM 210. As aforementioned, much of the binding is accomplished with the assistance of a trusted component, in FIG. 2, secure interface control 265. Program code of the secure interface control 265 in embodiments of the present invention, supports the configuration of passthrough access to the HSM 210. In order to support this aspect, program code executing on one or more processors configures the secure interface control 265 (i.e., program code of the secure interface control 265) to provide certain functionality.

The workflow 300 of FIG. 3 illustrates the functionality provided by the configured secure interface control 265. Specifically, the workflow 300 illustrates certain aspects of some embodiments of the present invention where based on including a HSM secret in the metadata of a secure guest, a trusted component (e.g., secure interface control 265, a secure interface control which is hardware, firmware, or a combination thereof) creates sessions for the secure guest, based on the HSM secret. Thus, all sessions created (i.e., initiated via login), key generation requests and sessions termination requests (i.e., initiated via logout), from the secure guest are intercepted by the secure interface control. Upon intercepting these requests, the program code of the secure interface control reissues the requests, which initially include standard login data and session codes provided by the HSM, with requests that include login data that includes the HSM secret and session codes generated by the secure interface control. Thus, the program code replaces the standard login data in the request with login data that includes the HSM secret and the program code replaces session codes provided by the HSM, with session codes generated by the secure interface control.

Referring to FIG. 3, certain aspects of the workflow are presented in an arbitrary order for the sake of illustration. Although depicted in an order, for ease of understanding, all aspects between the program code of the secure interface control opening a default session to the HSM to be used for secure keys of a secure guest not (yet) bound to any session with the HSM (310) and the program code determining that the secure guest has been terminated (370) are a loop of events, in which the remaining aspects (program code intercepting each HSM login session of the secure guest (320), program code associating the session (initiated by the login) with an HSM session that utilizes login data based on a secret of the secure guest (330), program code intercepts each HSM key generation and session logout request of the secure guest (340), program code replacing the session code for these actions with the associated session code based on the secret of the secure guest (350), and based on determining that a given event has occurred, program code closing all sessions based on the secret of the secure guest (360)) can occur in an arbitrary order, including, but not limited to the order of the workflow 300, and can also occur asynchronously at any time during the workflow 300.

Returning to FIG. 3 with reference to FIG. 2, in some embodiments of the present invention, the program code of the secure interface control 265 opens a default session to the HSM 210 to be used for secure keys of a secure guest 250 not (yet) bound to any session with the HSM 210 (310). The program code intercepts each HSM 210 login session of the secure guest 250 (320). The program code associates the session (initiated by the login) with a HSM 210 session that utilizes login data based on a secret of the secure guest 225 (330). In embodiments of the present invention, the secret 225 is not part of the guest 250 as it is independently transported to the secure interface control 265 (though a secure channel, i.e., encrypted) as part of the guest metadata and cryptographically linked to the guest 225. Thus, the secure interface control 265 can verify that guest 250 and metadata/secret 225 belong together. The program code of the HSM 265 can retain its associations of session codes based on the secret of the secure guest 225 with session codes returned to the secure guest 250, in a table 245. The HSM can provide and track session code returned to secure guests 250 in a table 215. As illustrated in FIG. 2, along with storing the table associating session codes based on secret of secure guest with session codes returned to secure guest 245, the program code of the secure interface control 265 also stores the HSM configuration of the secure guest 235.

Returning to FIG. 3, the program code intercepts each HSM key generation and session logout request of the secure guest 250 (340). The secured guest 250 stored the secure keys 230 wrapped by the HSM 210 with the master key 220. The program code replaces the session code for these actions with the associated session code (e.g., from the table 245) based on the secret of the secure guest 225 (350). The program code determines that the secure guest has been terminated (360). Based on determining that a given event has occurred, the program code closes all sessions based on the secret of the secure guest 225 (370). The given event can vary. In some embodiments of the present invention, the program code closes all sessions based on the secret of the secure guest 225 based on determining that the secure guest 250 had been terminated. The program code of the HSM 210 and other elements of the system can also take additional action to protect the security of the system when unexpected events occur. For example, in some embodiments of the present invention, the program code deletes all session state data if the HSM 210 is unplugged. In some embodiments of the present invention, program code executing on a processing device clears all sessions of the HSM 210 if the secure interface control 265 terminates unexpectedly.

In embodiments of the present invention, program code executing on processing resources, including the program code of the trusted component (e.g., secure interface control 265, FIG. 2), in order to bind a secure key (e.g., secure key 130, FIG. 2) of a secure guest (e.g., secure guest 250, FIG. 2) to the HSM (e.g., HSM 210, FIG. 2), accomplish at least five general aspects: 1) the program code of a secure interface control initially configures the relationship/connection between the HSM and a secure guest; 2) the program code of a secure interface control intercepts requests from the secure guest, ultimately returning a new session code to the secure guest; 3) the program code of a secure interface control intercepts requests from the secure guest for generation (wrapping with a master key) of a new secure key by the HSM; 4) the program code of a secure interface control intercepts requests from the secure guest to logout of a session with the HSM; and 5) based on stopping a secure guest, the program code of a secure interface control commences and completes various cleanup activities. FIGS. 4-8 illustrates workflow 400-800 for these aspects.

Figure 4:
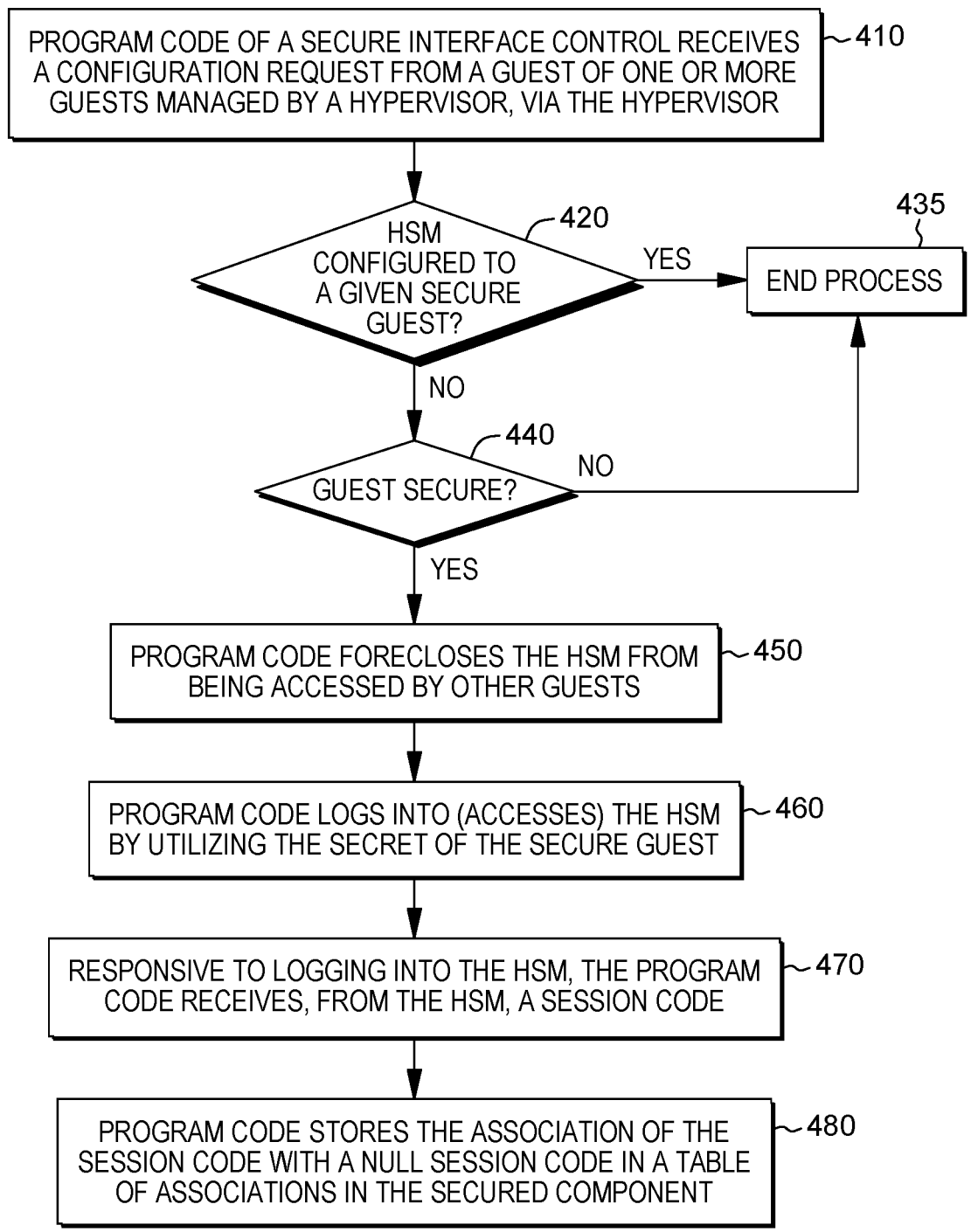
FIG. 4 is a workflow that illustrates certain aspects of some embodiments of the present invention.

Referring to FIG. 4, a workflow 400 illustrates the program code of a secure interface control initially configuring the relationship/connection between the HSM and a secure guest, in an embodiment of the present invention. As illustrated in FIG. 2, the secure interface control is communicatively couple to a HSM as well as to guests managed by a hypervisor, via the hypervisor. In an embodiment of the present invention, program code of a secure interface control (e.g., trusted FW, trusted component, etc.) receives a configuration request from a guest (e.g., virtual machine) of one or more guests managed by a hypervisor, via the hypervisor (e.g., virtual machine manager) (410). The program code determines if a HSM is already configured to a given guest of the one or more guests (420). Based on determining that the HSM is configured to the given guest, the program code returns an error responsive to the configuration request (435). In embodiments of the present invention, the program code of the secured component (e.g., secured FW, secure interface control) enforces that for HSMs configured to a guest, the hypervisor managing the guests cannot intercept any requests of the secure guest to the HSM.

Returning to FIG. 4, based on determining that the HSM is not configured to a given guest, the program code determines if the guest is a secure guest (e.g., authentication based on various aspects including metadata of the guest) (440). In embodiments of the present invention, the existence or type of metadata of a guest determines whether the guest is secure. Metadata is cryptographically linked to a guest (e.g., contains a signature of the guest image) so metadata of one guest cannot be misused as metadata of another guest. If the guest is not secure, this process terminates (435). Based on determining the guest a secure guest, the program code forecloses the HSM from being accessed by other guests (450). In some embodiments of the present invention, if the secure guest is started but not yet terminated, then no HSM configured for the secure guest (in particular no HSM on which a session was created using the HSM secret of the secure guest) may be configured to another guest (or component running in the system).

Referring to FIG. 4, the program code logs into (e.g., accesses) the HSM by utilizing the secret of the secure guest (460). Before the HSM is accessed by the secure guest for the first time, the program code of the secure interface control logs to the HSM using the HSM secret from the metadata of the secure guest. Responsive to logging into the HSM, the program code receives, from the HSM, a session code (470). The program code stores the association of the session code with a NULL session code in a table of associations in the secured component (480). Thus, the secure interface control stores the association of the NULL session code with the session code returned by the HSM in a table. In some embodiments of the present invention, this table associates session codes based on secrets of secure guests, with session codes returned to secure guest, by the HSM.

Figure 5:
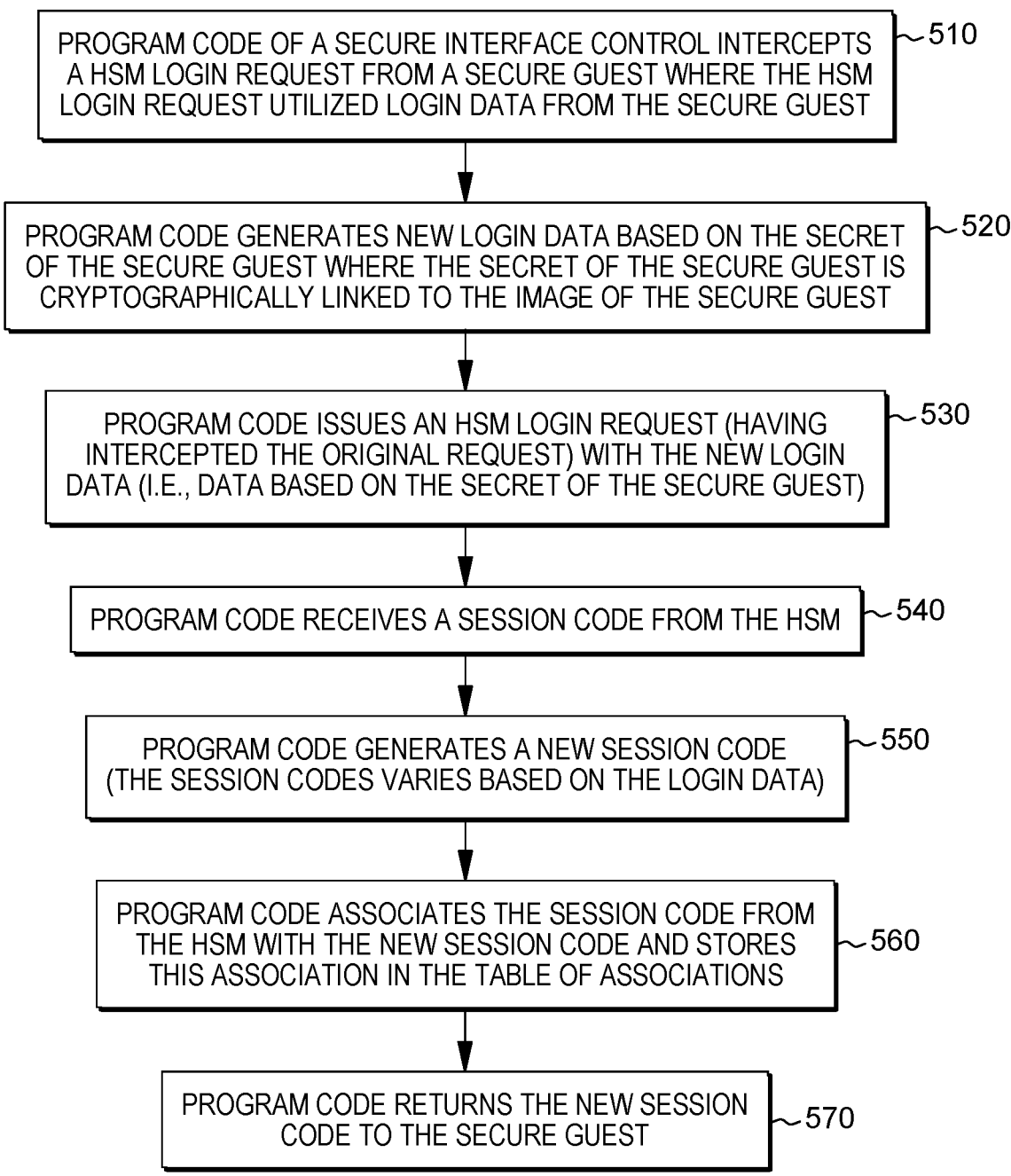
FIG. 5 is a workflow that illustrates certain aspects of some embodiments of the present invention.

Referring to FIG. 5, a workflow 500 illustrates the program code of a secure interface control intercepting requests from the secure guest, in an embodiments of the present invention. As illustrated in FIG. 5, program code of the secured component (e.g., secured FW), intercepts each session login request from the secure guest and reissues the login request with the secure guest's login data replaced by a combination of that login data and the HSM secret (e.g., by bitwise xor-ing the two pieces of data). Thus, instead of returning the session code returned by the HSM, the program code of the secure interface control generates a new session code (e.g., from the secure guest's login data) that is consistent with the specification of the login request and stores the association of the generated session code and the session code returned by the HSM in a table (e.g., table 265, FIG. 2).

Returning to FIG. 5, in some embodiments of the present invention, program code of a secure interface control (e.g., trusted FW, trusted component) intercepts a HSM login request from a secure guest where the HSM login request utilized login data from the secure guest (510). The program code generates new login data based on the secret of the secure guest where the secret of the secure guest is cryptographically linked to the image of the secure guest (520). The program code issues a HSM login request (having intercepted the original request) with the new login data (i.e., data based on the secret of the secure guest) (530). The program code receives a session code from the HSM (540). Based on receiving the session code from the HSM, the program code generates a new session code (the session codes varies based on the login data) (550). The program code associates the session code from the HSM with the new session code and stores this association in the table of associations (560). The program code returns the new session code to the secure guest (570).

Figure 6:
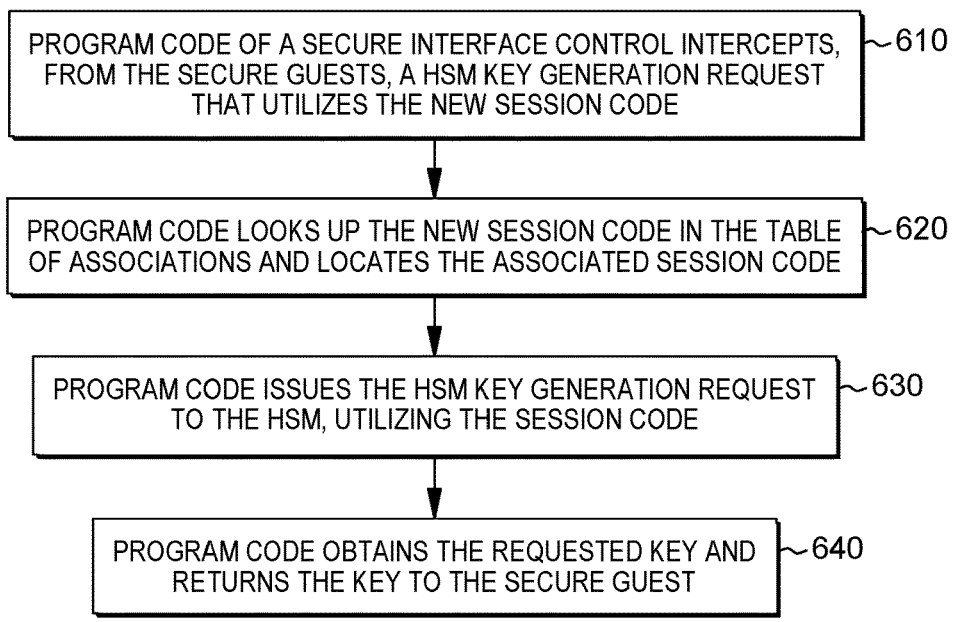
FIG. 6 is a workflow that illustrates certain aspects of some embodiments of the present invention.
Figure 7:
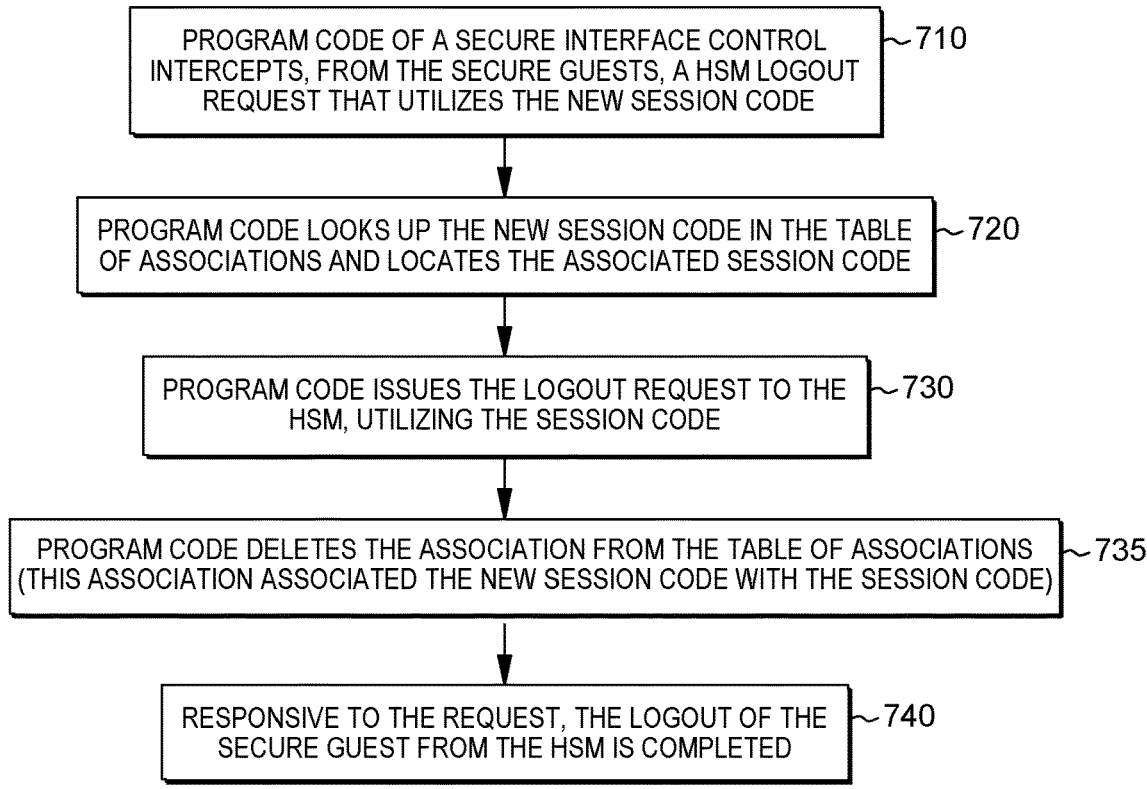
FIG. 7 is a workflow that illustrates certain aspects of some embodiments of the present invention.

In addition to intercepting HSM login requests from a secure guest, as illustrated in FIG. 5, in embodiments of the present invention, the program code of the trusted component (e.g., secure interface control 265, FIG. 2) also intercepts requests from the secure guest to the HSM, including but not limited to, generation requests and session logout requests. FIGS. 6-7 illustrate aspects of the handling, by the secured component, of key generation and logout requests, respectively. As illustrated in FIGS. 6-7, the program code of the secured component intercepts and reissues these requests with the session code provided by the secure guest being replaced by the session code provided by the HSM, as stored in the table of associations.

FIG. 6 is a workflow 600 that illustrates the program code of a secure interface control an HSM key generation request that utilizes the new session code (e.g., FIG. 5, 560). In some embodiments of the present invention, program code of a secure interface control (e.g., trusted FW, trusted component) intercepts, from the secure guests, a HSM key generation request that utilizes the new session code (610). The program code looks up the new session code in the table of associations and locates the associated session code (the session code from the HSM, e.g., FIG. 5, 540) (620). Based on locating the session code, the program code issues the HSM key generation request to the HSM, utilizing the session code (630). Responsive to the request, the program code obtains the requested key and returns the key to the secure guest (640). Thus, the program code returns the result of the HSM request to secure guest.

Similar to the workflow 600 on FIG. 6, FIG. 7 depicts a workflow 700 illustrating the program code of a secure interface control an HSM logout request that utilizes the new session code (e.g., FIG. 5, 560). In some embodiments of the present invention, program code of a secure interface control (e.g., trusted FW, trusted component) intercepts, from the secure guests, a HSM logout request that utilizes the new session code (710). The program code looks up the new session code in the table of associations and locates the associated session code (the session code from the HSM, e.g., FIG. 5, 540) (720). Based on locating the session code, the program code issues the HSM logout request to the HSM, utilizing the session code (730). The program code deletes the association from the table of associations (the association associated the new session code with the session code) (735). Responsive to the request, the logout of the secure guest from the HSM is completed (740).

Figure 8:
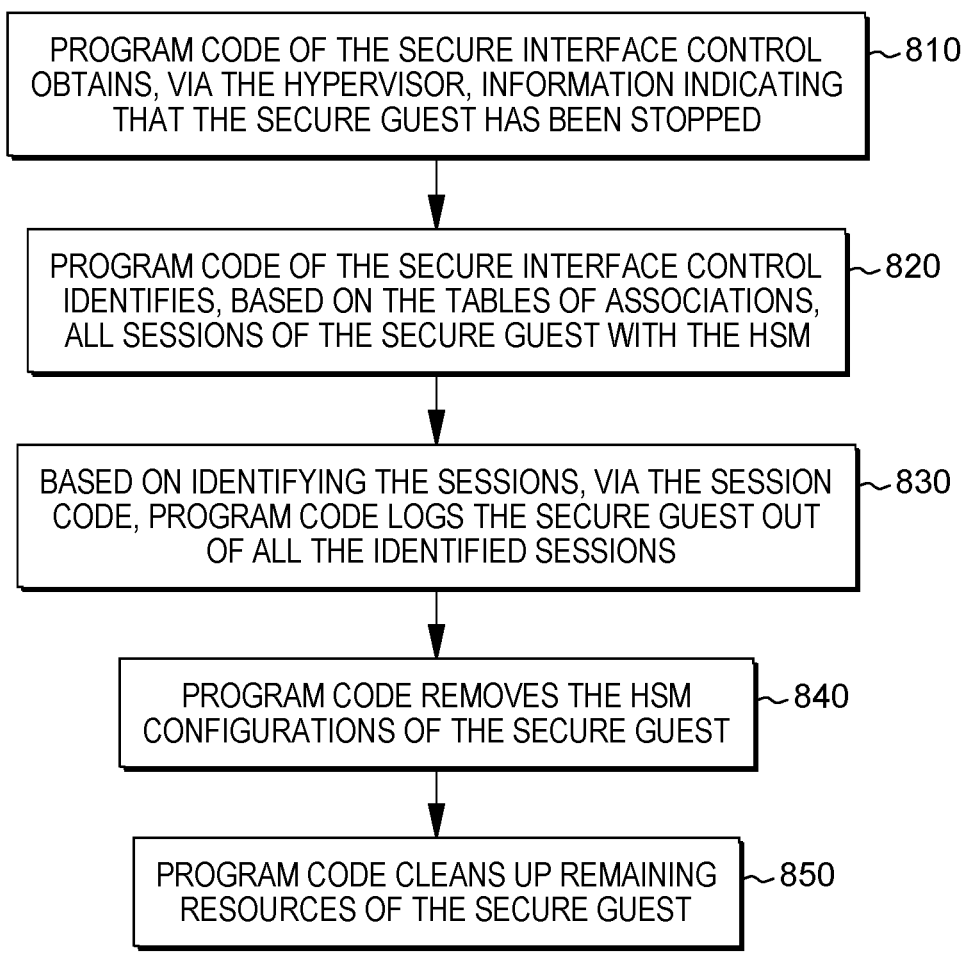
FIG. 8 is a workflow that illustrates certain aspects of some embodiments of the present invention.

FIG. 8 depicts a workflow 800 illustrating the program code terminating a secure guests, in some embodiments of the present invention. In general, in embodiments of the present invention, if the secure guest terminates, the secure interface control terminates all sessions it created (using the HSM secret of the secure guest). In some embodiments of the present invention, the program code of the secure interface control obtains, via the hypervisor, information indicating that the secure guest has been stopped (810). Based on determining that the secure guest has been stopped, the program code of the secured component identifies, based on the tables of associations, all sessions of the secure guest with the HSM (820). In some embodiments of the present invention, the program code can generate a list of all sessions associated with the session code. Based on identifying the sessions, via the session code, the program code logs the secure guest out of all the identified sessions (830). The program code removes the HSM configurations of the secure guest (840). The program code cleans up remaining resources of the secure guest (850).

Embodiments of the present invention include various security measures to protect the integrity of the HSM and the secure guest. For example, in some embodiments of the present invention, if the secure interface control crashes, then all sessions in the HSM are be terminated. Additionally, if the HSM is removed from the server, then all sessions in the HSM are terminated.

Embodiments of the present invention include a computer-implemented method, a computer program product and a system for binding secure keys of secure guests to a hardware security module. Various aspects of these embodiments are performed by a secure interface control, which can be comprised of software, hardware, and/or firmware. Software aspects are executed by one or more processors. Thus, for each of understanding, aspects of various embodiments of the present invention are described as being executed by, broadly, by program code, which can include the secure interface control, regardless of the composition of this aspect. Thus, in some embodiments of the present invention, program code configures a hardware security module for exclusive use by a secure guest managed by the hypervisor. The configuring includes: the program code obtaining a configuration request to configure the hardware security module, from a given guest of one or more guests managed by the hypervisor, via the hypervisor; the program code determining if the hardware security module is already configured to a specific guest of the one or more guests, wherein the specific guest and the given guest comprise different guests of the one or more guests; based on the program code determining that the hardware security module is not configured to the specific guest, the program code determining that the given guest comprises the secure guest by evaluating metadata of the given guest; based on determining that the given guest comprises a secure guest, the program code foreclosing establishing a configuration of the hardware security module by limiting accesses by guests to the hardware security module exclusively to the given guest of the one or more guests. The program code logging the given guest into the hardware security module, wherein the logging into the hardware security module comprises utilizing a secret of the given guest, wherein the metadata comprises the secret. Based on the program code logging into the hardware security module, the program code obtaining, from the hardware security module, a session code; and retaining, by the one or more processors, the session code.

In some embodiments of the present invention, the retaining comprises the program code storing an association of the session code with a NULL session code in a table of associations in the secure interface control.

In some embodiments of the present invention, the metadata of the guest is integrity protected and the secret is encrypted by a key derived using a private key owned by the secure interface control. The private key can comprises a cryptographic measure of a boot image of the given guest.

In some embodiments of the present invention, the program code, based on the configuring, provides, to the given guest, a new session code to utilize by the given guest in requests to the hardware security module.

In some embodiments of the present invention, the providing (by the program code) comprises: the program code intercepting a hardware security module login request from the given guest, wherein the hardware security module login request comprises login data from the given guest; the program code generating new login data based on the secret of the given guest; the program code issuing, to the hardware security module, a new hardware security module login request from the given guest, wherein the new hardware security module login request comprises the new login data; the program code obtaining a session code from the hardware security module; based on obtaining the session code from the hardware security module, the program code generating, the new session code; the program code storing an association between the session code from the hardware security module and the new session code in the table; and the program code transmitting the new session code to the given guest, responsive to the login request.

In some embodiments of the present invention, the program code intercepts a request from the given guest to the hardware security module, where the request comprises the new session code. The program code obtains, from the table, the session code from the hardware security module associated with the new session code. The program code updates the request from the given guest to comprise a new request, wherein the new request comprises the session code from the hardware security module instead of the new session code. The program code issues the new request to the hardware security module.

In some embodiments of the present invention, the program code obtains, from the hardware security module, fulfillment of the request. The program code issues the fulfillment of the request to the given guest. In some embodiments of the present invention, the request is selected from the group consisting of: a hardware security module secure key generation request, and a hardware security module logout request.

In some embodiments of the present invention, the program code obtains, from the hypervisor, an indication that the given guest has stopped. The program code identifies the association between the session code from the hardware security module and the new session code in the table. The program code generates a list of one or more sessions utilizing the session code from the hardware security module, based on the table. The program code logs out the given guest from the one or more sessions.

In some embodiments of the present invention, the program code obtains, from the hypervisor, an indication that the given guest has stopped. The program code removes the configuration.

In some embodiments of the present invention, the program code obtains, from the hypervisor, an indication that the given guest has stopped. The program code identifies references to the given guest retained in the hardware security module. The program code removes the references.

In some embodiments of the present invention, the secure interface component is selected from the group consisting of: firmware, hardware, and software.

In some embodiments of the present invention, determining that the given guest comprises the secure guest by evaluating metadata of the given guest comprises the program code verifying one of a presence or a type of the metadata.

In some embodiments of the present invention, the program code utilizing the secret of the given guest, comprises the program code decrypting the secret.

In some embodiments of the present invention, the decrypting comprises utilizing a key computed exclusively by the secure interface control.

Additional features are realized through the techniques described herein. Other embodiments and aspects are described in detail herein and are considered a part of the claimed aspects.

Referring now to FIG. 9, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the secure guest 250 (FIG. 2), the secure interface control 265 (e.g., secure interface control) (FIG. 2), and/or the hypervisor 240 (FIG. 2) can each be understood as executing on a cloud computing node 10 (FIG. 9) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
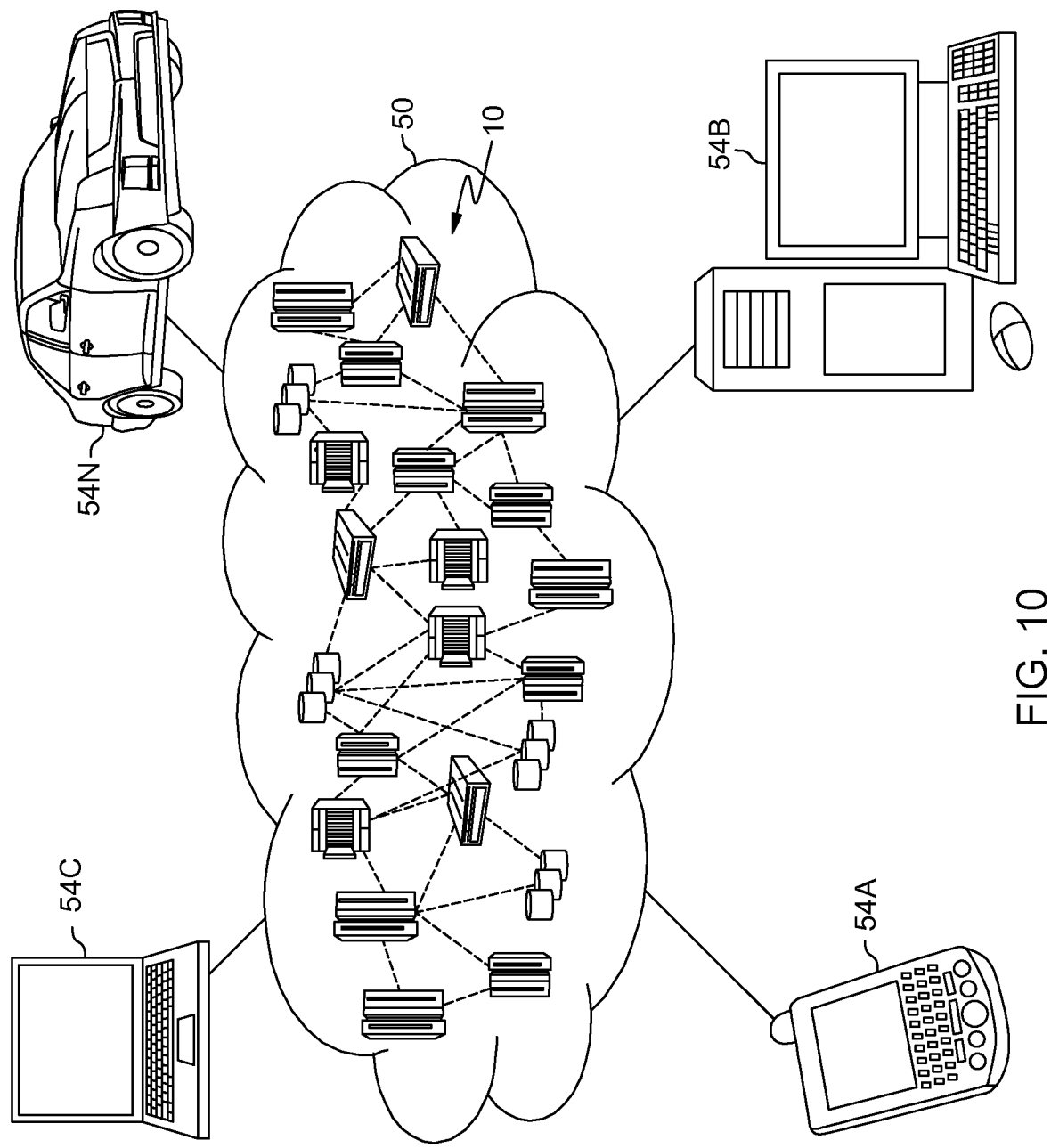
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
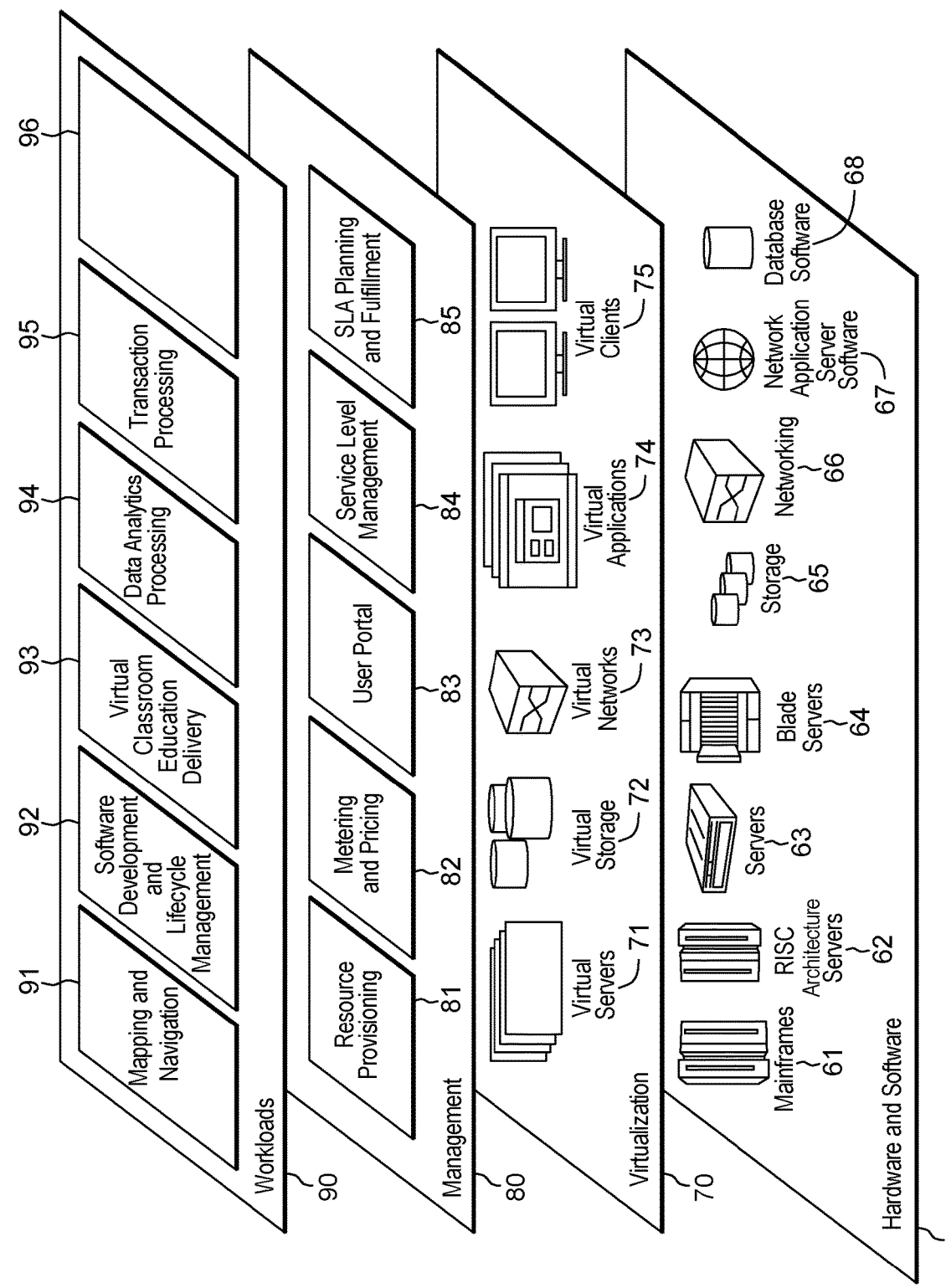
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and binding a secure key to a secure guest 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   configuring, by a secure interface control, communicatively coupled to a hypervisor and a hardware security module, the hardware security module for exclusive use by a secure guest managed by the hypervisor, the configuring comprising:
     obtaining, by the secure interface control, a configuration request to configure the hardware security module, from a given guest of one or more guests managed by the hypervisor, via the hypervisor;
     obtaining, by the secure interface control, via a secure channel, independently from obtaining the configuration request, metadata of the given guest;
     verifying, by the secure interface, that the metadata of the given guest belongs to the given guest;
     determining, by the secure interface control, if the hardware security module is already configured to a specific guest of the one or more guests, wherein the specific guest and the given guest comprise different guests of the one or more guests;
     based on determining that the hardware security module is not configured to the specific guest, determining, by the secure interface control, that the given guest; comprises the secure guest by evaluating metadata of the given guest, wherein the metadata comprises installation metadata to start an image of the given guest;
     based on determining that the given guest comprises the secure guest, foreclosing, by the secure interface control, establishing a configuration of the hardware security module by guests other than the given guest of the one or more guests by limiting accesses to the hardware security module exclusively to the given guest of the one or more guests;
     logging the given guest into the hardware security module, by the secure interface control, wherein the logging into the hardware security module comprises utilizing a secret of the given guest, wherein the metadata comprises the secret, wherein the secret is cryptographically linked to the image and cannot be utilized by another image;
     based on the logging into the hardware security module, obtaining, by the secure interface control, from the hardware security module, a session code; and
     retaining, by the secure interface control, the session code.

2. The computer-implemented method of claim 1, wherein the retaining comprises storing an association of the session code with a NULL session code in a table of associations in the secure interface control.

3. The computer-implemented method of claim 1, wherein the metadata of the guest is integrity protected and the secret is encrypted by a key derived using a private key owned by the secure interface control.

4. The computer-implemented method of claim 3, wherein the private key comprises a cryptographic measure of a boot image of the given guest.

5. The computer-implemented method of claim 2, further comprising:
   based on the configuring, providing, by the secure interface control, to the given guest, a new session code to utilize by the given guest in requests to the hardware security module.

6. The computer-implemented method of claim 5, wherein the providing comprises:
   intercepting, by the secure interface control, a hardware security module login request from the given guest, wherein the hardware security module login request comprises login data from the given guest;
   generating, by the secure interface control, new login data based on the secret of the given guest;
   issuing, by the secure interface control, to the hardware security module, a new hardware security module login request from the given guest, wherein the new hardware security module login request comprises the new login data;

obtaining, by the secure interface control, a session code from the hardware security module;

based on obtaining the session code from the hardware security module, generating, by the secure interface control, the new session code;

storing, by the secure interface control, an association between the session code from the hardware security module and the new session code in the table; and transmitting, by the secure interface control, the new session code to the given guest, responsive to the login request.

7. The computer-implemented method of claim 5, further comprising:

intercepting, by the secure interface control, a request from the given guest to the hardware security module, wherein the request comprises the new session code;

obtaining, by the secure interface control, from the table, the session code from the hardware security module associated with the new session code;

updating, by the secure interface control, the request from the given guest to comprise a new request, wherein the new request comprises the session code from the hardware security module instead of the new session code; and issuing, by the secure interface control, the new request to the hardware security module.

8. The computer-implemented method of claim 7, further comprising:

obtaining, by the secure interface control, from the hardware security module, fulfillment of the request; and issuing, by the secure interface control, the fulfillment of the request to the given guest.

9. The computer-implemented method of claim 8, wherein the request is selected from the group consisting of: a hardware security module secure key generation request, and a hardware security module logout request.

10. The computer-implemented of claim 6, further comprising:

obtaining, by the secure interface control, from the hypervisor, an indication that the given guest has stopped;

identifying, by the secure interface component, the association between the session code from the hardware security module and the new session code in the table;

generating, by the secure interface component, a list of one or more sessions utilizing the session code from the hardware security module, based on the table; and logging out the given guest, by the secure interface component, from the one or more sessions.

11. The computer-implemented method of claim 1, further comprising:

obtaining, by the secure interface control, from the hypervisor, an indication that the given guest has stopped;

removing, by the secure interface control, the configuration.

12. The computer-implemented of claim 6, further comprising:

obtaining, by the secure interface control, from the hypervisor, an indication that the given guest has stopped;

identifying, by the secure interface component, references to the given guest retained in the hardware security module; and removing, by the secure interface component, the references.

13. The computer-implemented method of claim 1, wherein the secure interface component is selected from the group consisting of: firmware, hardware, and software.

14. The computer-implemented method of claim 1, wherein determining that the given guest comprises the secure guest by evaluating metadata of the given guest comprises verifying one of a presence or a type of the metadata.

15. The computer-implemented method of claim 1, wherein utilizing the secret of the given guest, comprises decrypting, by the secure interface control, the secret.

16. The computer-implemented method of claim 15, wherein the decrypting comprises utilizing a key computed exclusively by the secure interface control.

17. A computer program product comprising:

a non-transitory computer readable storage medium readable by one or more processors and storing instructions for execution by the one or more processors for performing a method comprising:

configuring, by the one or more processors, communicatively coupled to a hypervisor and a hardware security module, the hardware security module for exclusive use by a secure guest managed by the hypervisor, the configuring comprising:

obtaining, by the one or more processors, a configuration request to configure the hardware security module, from a given guest of one or more guests managed by the hypervisor, via the hypervisor;

obtaining, by the one or more processors, via a secure channel, independently from obtaining the configuration request, metadata of the given guest;

verifying, by the one or more processors, that the metadata of the given guest belongs to the given guest;

determining, by the one or more processors, if the hardware security module is already configured to a specific guest of the one or more guests, wherein the specific guest and the given guest comprise different guests of the one or more guests;

based on determining that the hardware security module is not configured to the specific guest, determining, by the one or more processors, that the given guest comprises the secure guest by evaluating metadata of the given guest, wherein the metadata comprises installation metadata to start an image of the given guest;

based on determining that the given guest comprises the secure guest, foreclosing, by the one or more processors, establishing a configuration of the hardware security module by guests other than the given guest of the one or more guests by limiting accesses to the hardware security module exclusively to the given guest of the one or more guests;

logging the given guest into the hardware security module, by the one or more processors, wherein the logging into the hardware security module comprises utilizing a secret of the given guest, wherein the metadata comprises the secret, wherein the secret is cryptographically linked to the image and cannot be utilized by another image;

based on the logging into the hardware security module, obtaining, by the one or more processors, from the hardware security module, a session code; and retaining, by the one or more processors, the session code.

18. The computer program product of claim 17, wherein the retaining comprises storing an association of the session code with a NULL session code in a table accessible to the one or more processors.

19. The computer program product of claim 17, wherein the metadata of the guest is integrity protected and the secret is encrypted by a key derived using a private key owned by the secure interface control.

20. A system comprising:
- a memory;
- one or more processors in communication with the memory;
- program instructions executable by the one or more processors via the memory to perform a method, the method comprising:
  - configuring, by the one or more processors, communicatively coupled to a hypervisor and a hardware security module, the hardware security module for exclusive use by the secure guest managed by the hypervisor, the configuring comprising:
    - obtaining, by the one or more processors, a configuration request to configure the hardware security module, from a given guest of one or more guests managed by the hypervisor, via the hypervisor;
    - obtaining, by the one or more processors, via a secure channel, independently from obtaining the configuration request, metadata of the given guest;
    - verifying, by the one or more processors, that the metadata of the given guest belongs to the given guest;
    - determining, by the one or more processors, if the hardware security module is already configured to a specific guest of the one or more guests, wherein the specific guest and the given guest comprise different guests of the one or more guests;
    - based on determining that the hardware security module is not configured to the specific guest, determining, by the one or more processors, that the given guest comprises the secure guest by evaluating metadata of the given guest, wherein the metadata comprises installation metadata to start an image of the given guest;
    - based on determining that the given guest comprises the secure guest, foreclosing, by the one or more processors, establishing a configuration of the hardware security module by guests other than the given guest of the one or more guests by limiting accesses to the hardware security module exclusively to the given guest of the one or more guests;
    - logging the given guest into the hardware security module, by the one or more processors, wherein the logging into the hardware security module comprises utilizing a secret of the given guest, wherein the metadata comprises the secret, wherein the secret is cryptographically linked to the image and cannot be utilized by another image;
    - based on the logging into the hardware security module, obtaining, by the one or more processors, from the hardware security module, a session code; and
    - retaining, by the one or more processors, the session code.

* * * * *